US010885284B2

(12) United States Patent
Cordell et al.

(10) Patent No.: US 10,885,284 B2
(45) Date of Patent: Jan. 5, 2021

(54) MONITORING AND MANAGEMENT CONFIGURATION FOR AGENT ACTIVITY

(71) Applicant: Language Line Services, Inc., Monterey, CA (US)

(72) Inventors: Jeffrey Cordell, Carmel, CA (US); James Boutcher, Carmel, CA (US); Lindsay D'Penha, Carmel, CA (US); Jordy Boom, Marina, CA (US)

(73) Assignee: Language Line Services, Inc., Monterey, CA (US)

( * ) Notice: Subject to any disclaimer, the term of this patent is extended or adjusted under 35 U.S.C. 154(b) by 207 days.

(21) Appl. No.: 16/107,809

(22) Filed: Aug. 21, 2018

(65) Prior Publication Data

US 2020/0065390 A1 Feb. 27, 2020

(51) Int. Cl.
*G06F 40/58* (2020.01)
*H04M 3/523* (2006.01)
*G10L 15/00* (2013.01)
*H04M 3/51* (2006.01)

(52) U.S. Cl.
CPC ............ *G06F 40/58* (2020.01); *G10L 15/005* (2013.01); *H04M 3/5175* (2013.01); *H04M 3/523* (2013.01); *H04M 3/5232* (2013.01)

(58) Field of Classification Search
CPC ............................. G06F 40/58; H04M 3/5232
See application file for complete search history.

(56) References Cited

U.S. PATENT DOCUMENTS

| | | | | |
|---|---|---|---|---|
| 2003/0179888 A1* | 9/2003 | Burnett | ............... | G10L 21/0208 381/71.8 |
| 2004/0111310 A1* | 6/2004 | Szlam | .................. | G06Q 30/018 705/317 |
| 2004/0117185 A1* | 6/2004 | Scarano | .............. | H04M 3/2281 704/254 |
| 2005/0286705 A1* | 12/2005 | Contolini | ............ | H04M 3/5232 379/265.02 |
| 2007/0294076 A1* | 12/2007 | Shore | ...................... | G06F 40/58 704/2 |
| 2008/0222286 A1* | 9/2008 | Plumpton | ............... | G06Q 10/10 709/224 |
| 2014/0142917 A1* | 5/2014 | D'Penha | ................. | G06F 40/51 704/2 |
| 2019/0073618 A1* | 3/2019 | Kanukurthy | ....... | G06Q 10/0635 |

* cited by examiner

*Primary Examiner* — Feng-Tzer Tzeng
(74) *Attorney, Agent, or Firm* — Patent Ingenuity, P.C .; Samuel K. Simpson

(57) ABSTRACT

A configuration is implemented via a processor to receive a request to perform a service. Further, the configuration selects a human representative from a plurality of human representatives associated with a communication center based on a computing device associated with the human representative indicating that the human representative is online and available to perform the service. In addition, the configuration routes the request to the computing device associated with the human representative. The configuration also monitors activity of the human representative at the computing device associated with the human representative. Further, the configuration determines that the activity of the human representative is inconsistent with the human representative being available to perform the service. Finally, the configuration reroutes the request to a different computing device associated with a different human representative.

17 Claims, 8 Drawing Sheets

US 10,885,284 B2

MONITORING AND MANAGEMENT CONFIGURATION FOR AGENT ACTIVITY

BACKGROUND

1. Field

This disclosure generally relates to the field of call center configurations. More particularly, the disclosure relates to monitoring and management of agent activity with respect to a call center.

2. General Background

Conventional configurations typically provide one or more services (e.g., language interpretation) via one or more human agents situated onsite at, or remote to, a physical call center. For instance, a user requesting a service may place a telephone call to the call center, and a computerized routing system associated with the call center may route the telephone call to an agent, onsite or remote, so that the agent may perform the service for the user. As part of the routing process, the routing system determines which agents are available (e.g., online but not attending to another customer). In other words, conventional configurations rely on an indication from the agent that the agent is available to provide the requested service.

Yet, some agents will provide an indication of being available even though they are not really available to perform the requested service. For example, an agent may inadvertently leave an availability indicium, provided via a graphical user interface ("GUI") at an agent terminal connected to the routing system, marked as available when the agent temporarily steps away from a desk at which the agent is situated. As a result, the routing system of conventional configurations routes telephone calls to agents that the routing system determines are available, but are not really available. Accordingly, users may be placed in queues and experience significant wait times to obtain the requested services. Therefore, current routing configurations operate in an inefficient manner.

SUMMARY

A configuration is implemented via a processor to receive a request for spoken language interpretation from a first spoken language to a second spoken language. Further, the configuration selects a language interpreter from a plurality of language interpreters associated with a communication center based on a computing device associated with the language interpreter indicating that the language interpreter is online and available to perform the spoken language interpretation. In addition, the configuration routes the request to the computing device associated with the human language interpreter. The configuration also monitors activity of the language interpreter at the computing device associated with the human language interpreter. Additionally, the configuration determines that the activity of the language interpreter is inconsistent with the language interpreter being available to perform the spoken language interpretation. Finally, the configuration reroutes the request to a different computing device associated with a different human language interpreter.

In another embodiment, a configuration is implemented via a processor to receive a request to perform a service. Further, the configuration selects a human representative from a plurality of human representatives associated with a communication center based on a computing device associated with the human representative indicating that the human representative is online and available to perform the service. In addition, the configuration routes the request to the computing device associated with the human representative. The configuration also monitors activity of the human representative at the computing device associated with the human representative. Further, the configuration determines that the activity of the human representative is inconsistent with the human representative being available to perform the service. Finally, the configuration reroutes the request to a different computing device associated with a different human representative.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A monitoring and management configuration is provided to monitor and manage agent activity at one or more agent computing devices in operable communication with a call center that routes requests for services to one or agents that provide services. The monitoring and management configuration may include a machine learning engine that utilizes one or more rules to determine if an agent's lack of activity matches a pattern corresponding to a lack of compliance with an organizational policy. For instance, the monitoring and management configuration may determine a lack of agent activity (e.g., lack of voice energy emitted by the agent, lack of agent interaction with a software application, lack of user input at a computer hardware device, etc.). If the monitoring and management configuration determines a lack of agent activity, the monitoring and management configuration may reroute the request to a different agent—prior to, or after, the call was routed to the language interpreter. Further, the monitoring and management configuration may determine that factors other than a lack of agent activity (e.g., environment factors such as noise, connection quality, location-based anomalies, statistics of recent communications, etc.) may trigger rerouting of the request. Moreover, the monitoring and management configuration may provide a training video to the agent after performing the rerouting to train the agent to better comply with organizational policies.

In contrast with previous configurations that expended significant amounts of compute resources on agent devices associated with an online agent, whom is not really online, the monitoring and management configuration improves the functionality of a computer by allocating compute resources to agents that are deemed to actually be online. For example, rather than having a processor constantly attempting to connect a user to an agent for extended periods of time, the processor of the monitoring and management configuration may more quickly determine if an online agent is really offline, and then reroute the telephone call to an agent that is deemed to really be online. Therefore, the processing speed of a processor is increased by minimizing, or avoiding, connection attempts with agent devices associated with agents that are not really online.

Figure 1:
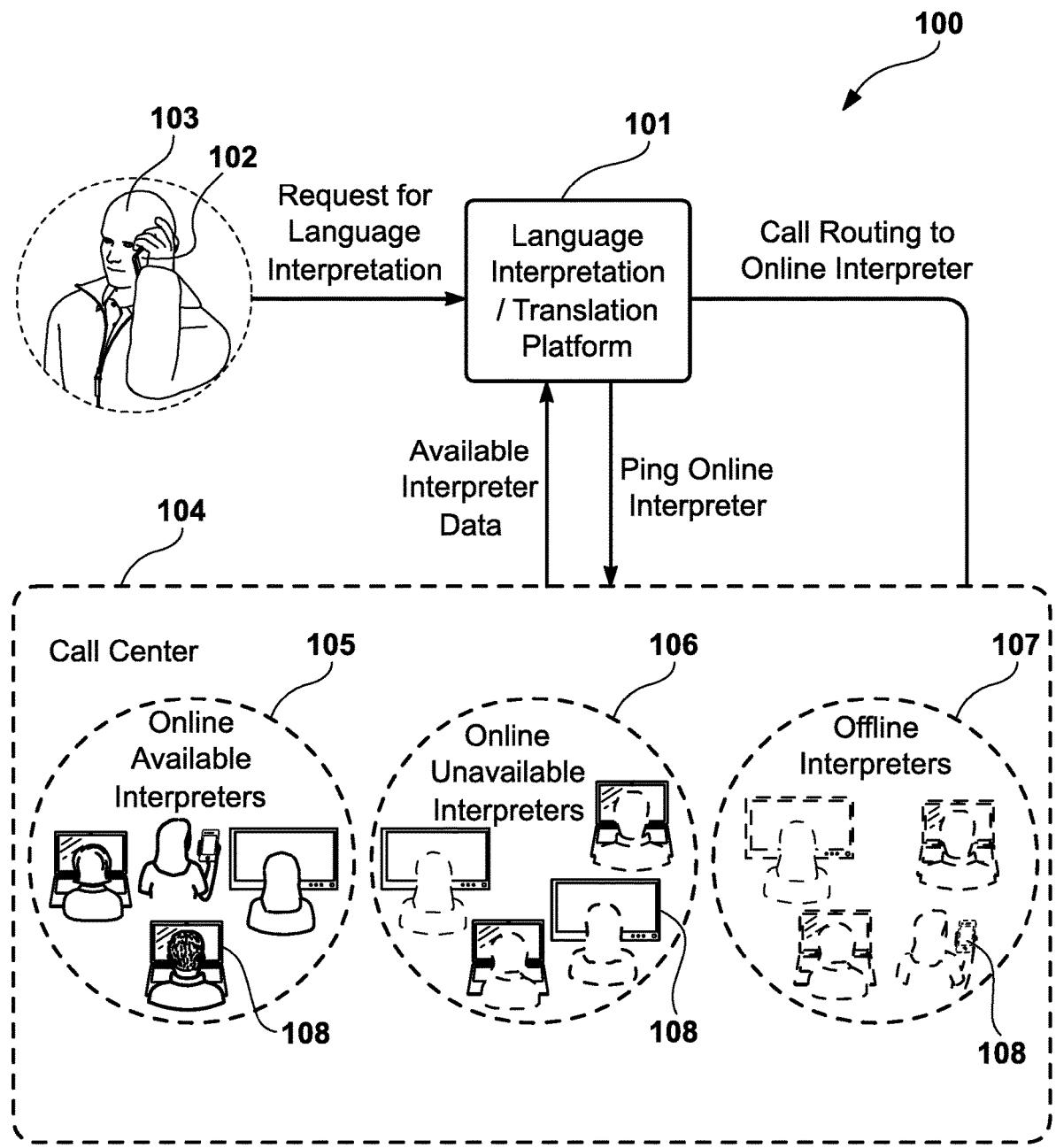
FIG. 1 illustrates a monitoring and management configuration, as exemplified in the context of a language interpretation call center.

FIG. 1 illustrates a monitoring and management configuration 100, as exemplified in the context of a language interpretation call center 104. Various other types of call centers providing other services may also implement the monitoring and management configuration 100.

For example, a call center 104 may have various language interpreters that are available to provide language interpretation services for a user 103 from a first spoken language (e.g., English) to a second spoken language (e.g., Spanish). The user 103 may use a telephone, mobile computing device 102 (e.g., smartphone, tablet device, smart watch, smart wearable, etc.), personal computer, laptop computer, or other communication-enabled device to communicate with a language interpretation/translation platform 101. A mobile computing device 102 is depicted for illustrative purposes.

The mobile computing device 102 sends the request for language interpretation to a language interpretation/translation platform 101. Further, the language interpretation/translation platform 101 sends a ping, or other form of data request, to the call center 104. Moreover, various computing devices 108 positioned at the call center 104 respond to the ping by indicating online availability for a language interpreter. For example, the call center may have different groups of interpreters. The first group 105 includes interpreters that have indicated that they are online, and really are available. In contrast, the second group 106 includes interpreters that have indicated that they are online, but they are not really available. Further, the third group 107 includes interpreters that have indicated that they are offline, thereby being unavailable. Therefore, in response to the ping from the language interpretation/translation platform 101, the computing devices 108 associated with both the first group 105 and the second group 106 respond indicating availability.

In one embodiment, an indication of availability/unavailability of an agent (e.g., language interpreter) is automatically determined by a service platform (e.g., the language interpretation/translation platform 101) at the completion of a service. For example, in an attempt to reduce the time, and corresponding inefficiencies of agents, in between communications, the service platform may automatically indicate that agents are available at the completion of service requests—even if the agents are really unavailable. In another embodiment, the indication of availability/unavailability of an agent is inputted by the agent at the completion of the communication request.

Although the call center 104 is illustrated as having all of the interpreters positioned therein, the call center 104 may, instead, encompass remotely situated interpreters. As another alternative, the call center 104 may include locally situated interpreters and some remotely situated interpreters. For example, the computing devices may be mobile devices (e.g., smart phones, tablet devices, smart watches, smart wearables, etc.).

Moreover, availability, as illustrated in FIG. 1, is not limited to physical availability (e.g., physically present in the call center 104). For instance, availability for performing language interpretation may be determined according to compliance with one or more organizational policies. As an example, a language interpreter may physically positioned in front of the computing device 108 (FIG. 1) but may not be in an environment that meets a predetermined noise threshold. As yet another example, the language interpreter may not be dressed according to a predetermined dress code (e.g., uniform) that is required for a video conference to perform language interpretation.

Figure 2:
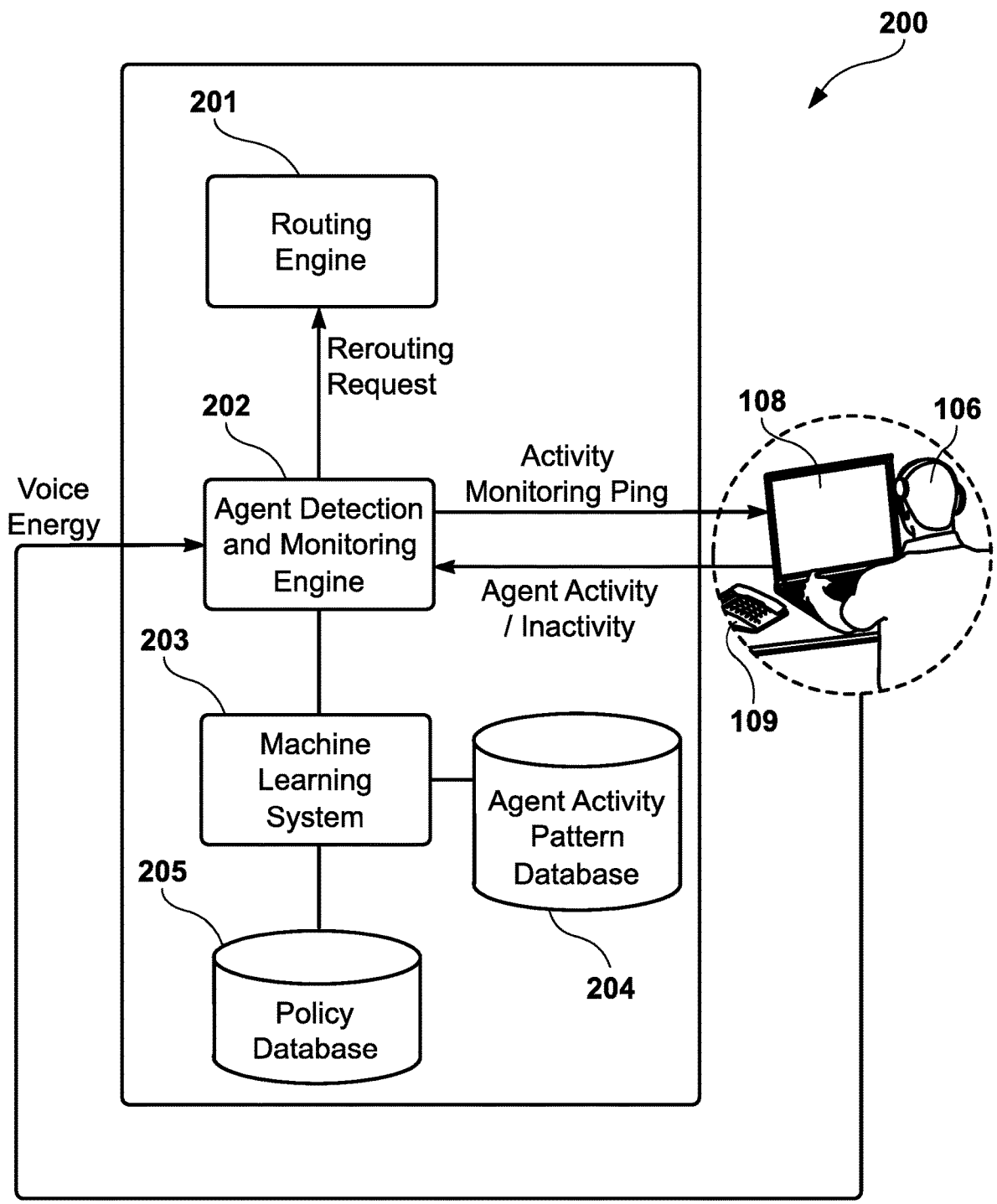
FIG. 2 illustrates a re-routing configuration that may be used by the monitoring and management configuration to re-route language interpretation requests.

Further, FIG. 2 illustrates a re-routing configuration 200 that may be used by the monitoring and management configuration 100 to re-route language interpretation requests. For instance, if the monitoring and management configuration 100 illustrated in FIG. 1 determines, as a result of sending the ping, that an interpreter to which a call has been routed is actually unavailable, the re-routing configuration 200 may reroute the telephone call to an interpreter that actually is available.

The rerouting configuration 200 has a routing engine 201 that routes, and/or reroutes based on a request from an agent detection and monitoring engine 202, communications from the user 103 illustrated in FIG. 1 to a language interpreter in operable communication with the call center 104. The agent detection and monitoring engine 202 detects and monitors availability of language interpreters. For example, the agent detection and monitoring engine 202 may monitor desktop applications on the computing device 108, voice energy emitted via a voice capture device (e.g., telephone 109, microphone, headset, etc.), keyboard input at the computing device 108, mouse input at the computing device 108, video/images captured of the agent, etc. By receiving data corresponding to agent activity/inactivity, the agent detection and monitoring engine 202 may detect if the language interpreter 106 is online, but really unavailable.

Additionally, the rerouting configuration 200 may have a machine learning system 203 that performs machine learning to determine if the language interpreter, who is indicated as being online, is really offline. For instance, the machine learning system 203 may access an agent activity pattern database 204 to determine one or more patterns indicative of activity/inactivity associated with unavailability. For example, a pattern of a language interpreter not answering two phone calls within a five minute period may correspond to a substantial probability of unavailability based on a plurality of similar instances stored in the agent activity pattern database 204. Accordingly, the machine learning system may generate instructions for the rerouting configuration 200 to reroute a telephone call according to a probability of unavailability based on one or more patterns, which are stored in the agent activity pattern database.

Further, the machine learning system 203 may perform machine learning based on one or more organizational policies stored in a policy database 205. The one or more organizational policies may be specific to the requirements of a specific organization (i.e., noise tolerance, dress code, etc.).

Additionally, the agent activity pattern database 204 may store patterns particular to a particular agent. For instance, the computing device 108 may be a smartphone with a GPS device that regularly sends a particular location to the agent detection and monitoring engine. If the agent detection and monitoring engine 202 detects an anomaly (e.g., the GPS device is located outside of a predetermined threshold), the agent detection and monitoring engine 202 may reroute the communication. The machine learning system 202 may also access other databases (e.g., a scheduling database) to attempt to reconcile any anomalies. For example, the machine learning system 202 may determine that an anomaly associated with a language interpreter being outside of a geographical radius is the result of the language interpreter traveling for a work-related project that was scheduled in the scheduling database. Accordingly, the language interpreter may be available to perform language interpretation in that instance.

Figure 3A:
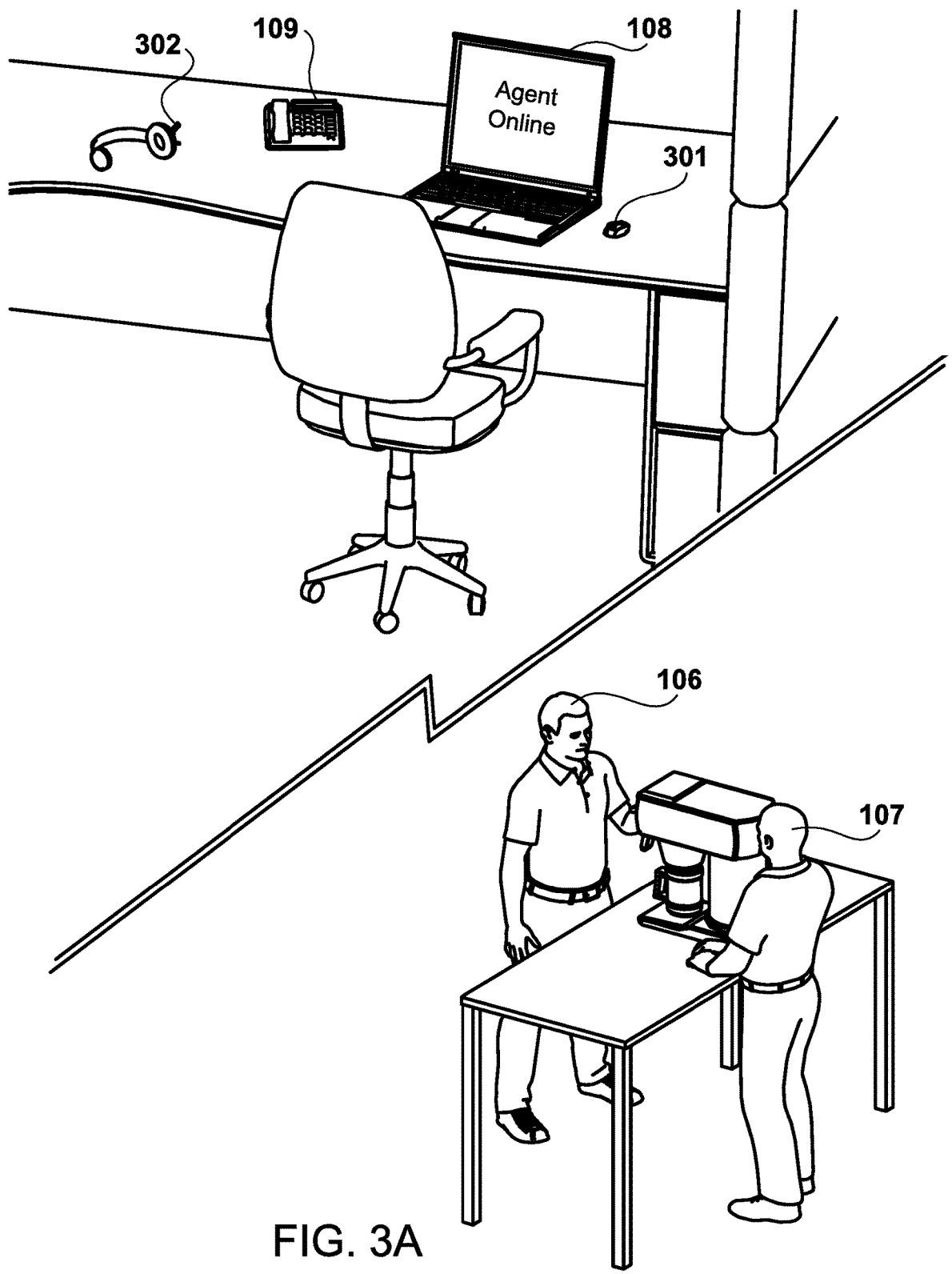
FIG. 3A illustrates the computing device indicating that the language interpreter is online, yet the language interpreter is not even positioned in front of the computing device.

FIGS. 3A-3D illustrate examples online language interpreters that are available/unavailable. For example, FIG. 3A illustrates the computing device 108 indicating that the language interpreter 106 is online, yet the language interpreter 106 is not even positioned in front of the computing device 108; instead, the language interpreter 106 is positioned at a coffee machine and is having a conversation with offline language interpreter 107.

Figure 3B:
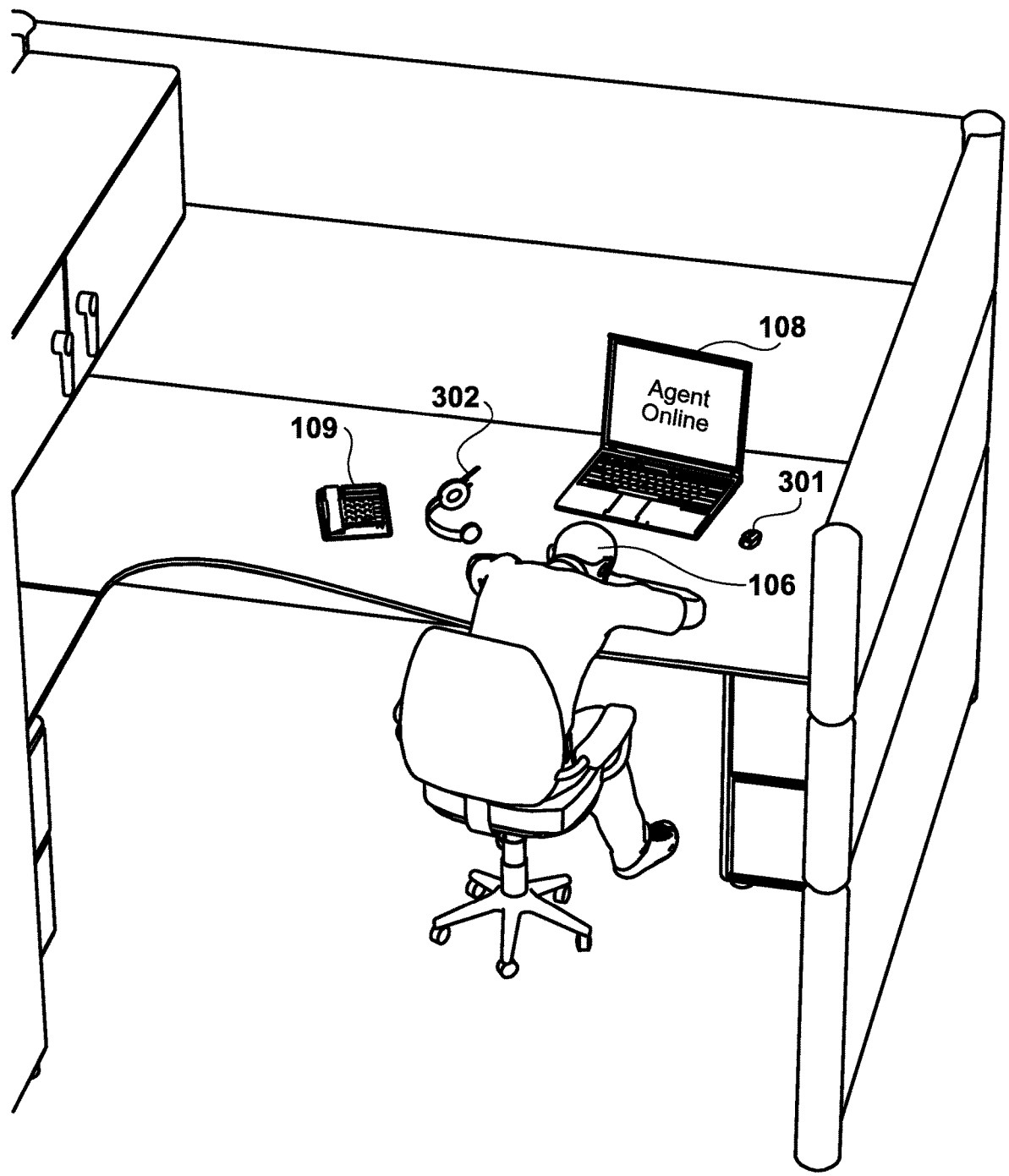
FIG. 3B illustrates the language interpreter is otherwise preoccupied when in front of the computing device.

As another example, FIG. 3B illustrates the language interpreter 106 is otherwise preoccupied when in front of the computing device 108. For instance, the language interpreter 106 may be taking a nap rather than being available for providing language interpretation.

Figure 3C:
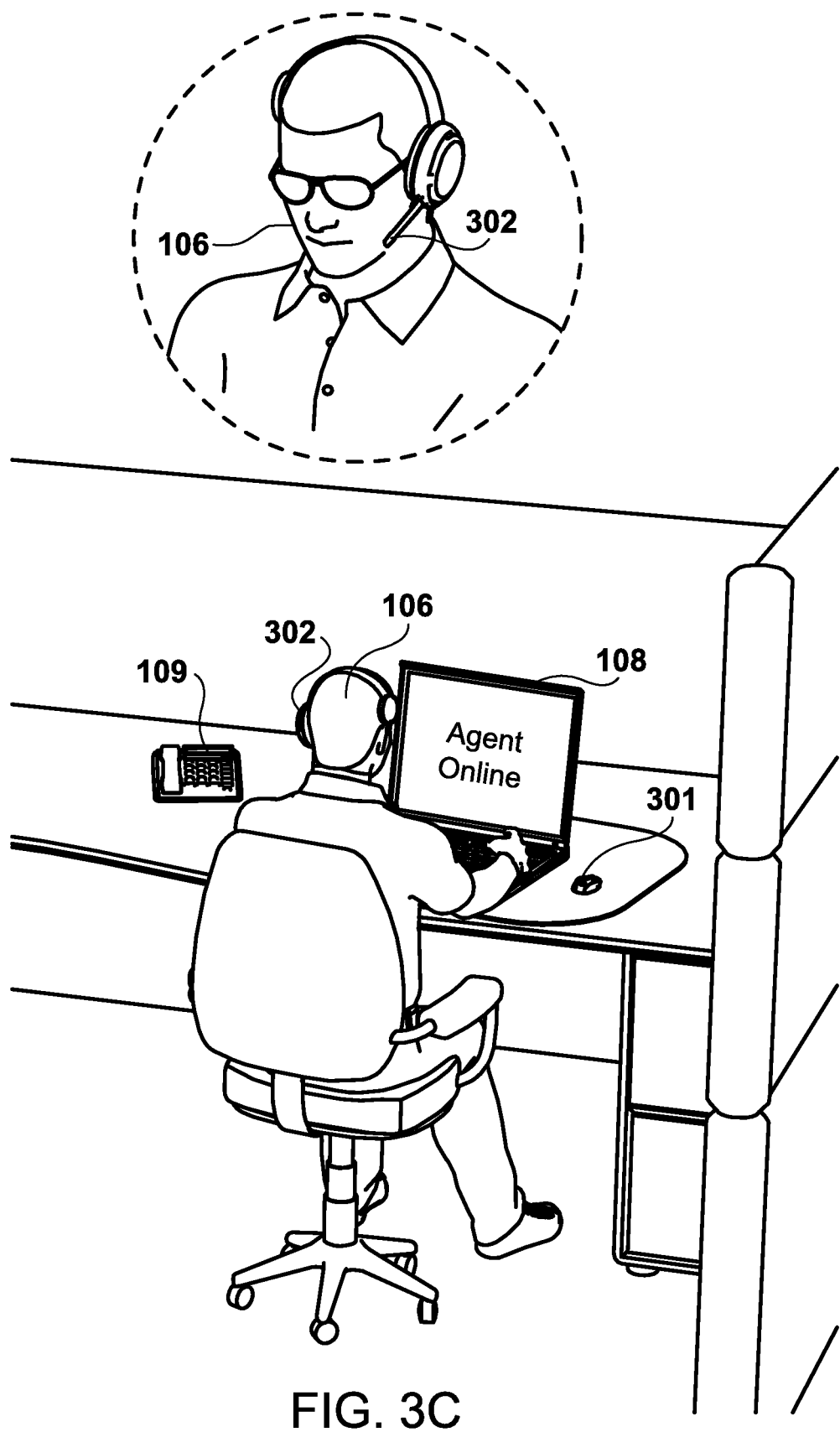
FIG. 3C illustrates the language interpreter situated in front of the computing device 108, but not providing language interpretation according to a predefined organizational policy stored in the policy database.

As yet another example, FIG. 3C illustrates the language interpreter 106 situated in front of the computing device 108, but not providing language interpretation according to a predefined organizational policy stored in the policy database 205 (FIG. 2). For instance, the language interpreter 106 may have used wording or phraseology commensurate with a cold transfer of the user 103 (FIG. 1) to another professional, rather than a warm transfer. As another example, the language interpreter 106 may have taken a number of telephone calls that exceed a predetermined threshold within a certain time period, which may impact the performance of the language interpreter 106 as determined by the machine learning system 203 (FIG. 2). As another example, the machine learning system 203 may obtain data from one or more sensors (e.g., heart rate monitor, voice analysis device, etc.) in operable communication with the computing device 108 that determine a stress level of the language interpreter 106. Other factors such as number of missed calls, timeliness of greeting, etc. may be considered as part of the agent activity/inactivity analysis. Accordingly, the rerouting engine 201 may reroute a communication with the user 103 to a different language interpreter 106 to allow the language interpreter 106 to have some time to recompose himself or herself prior to performing the next language interpretation service.

Figure 3D:
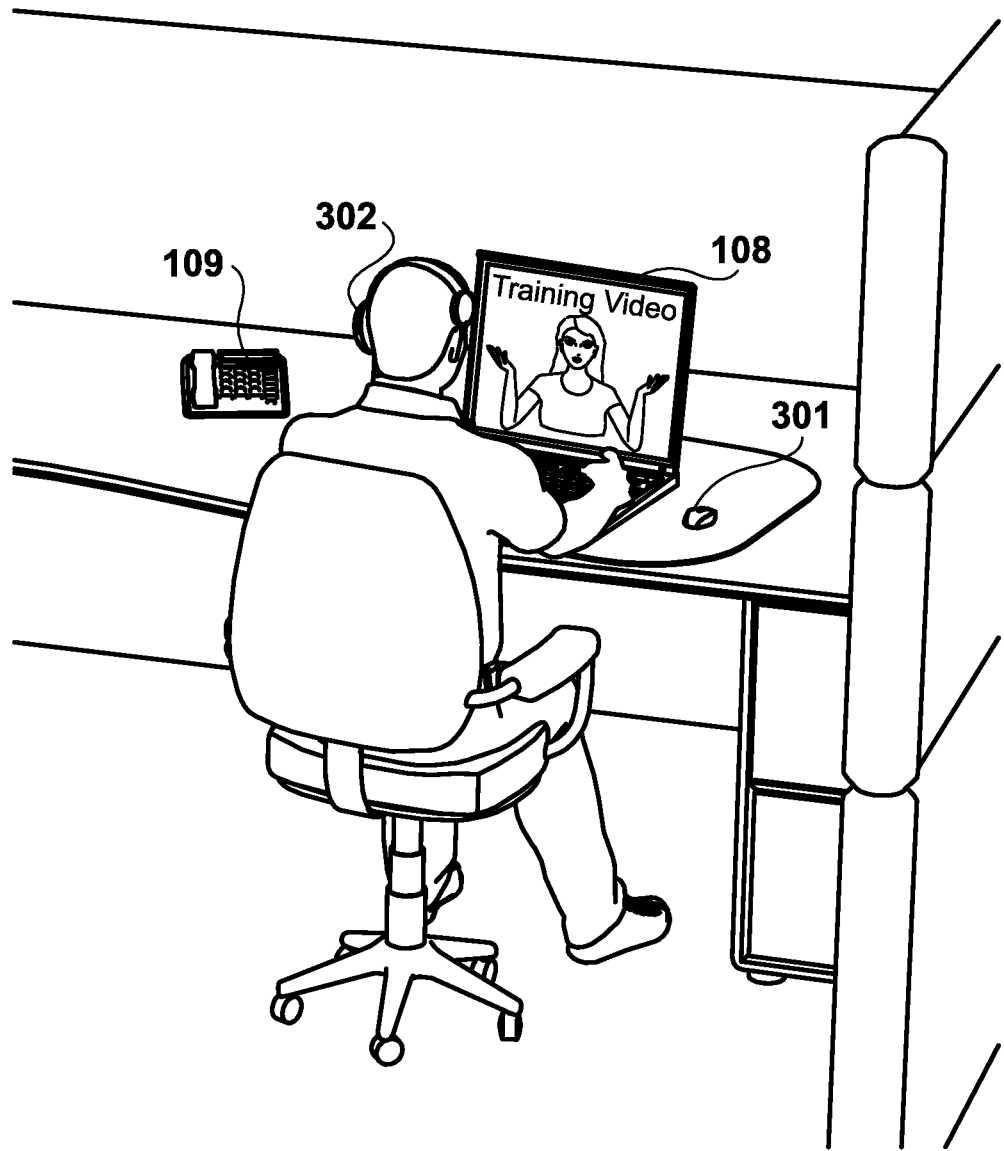
FIG. 3D illustrates an example of the computing device displaying a training video.

In another embodiment, the machine learning system 203 illustrated in FIG. 2 may send a training video to the language interpreter 106 if the language interpreter 106 is not complying with the predefined organizational policy stored in the policy database 205. FIG. 3D illustrates an example of the computing device 108 displaying the training video. Accordingly, the training video may elaborate on how the language interpreter 106 may improve his or her compliance with the predefined organizational policy.

Although a telephone call is discussed and illustrated, various other forms of communication may be used in conjunction with the monitoring and management configuration 100 illustrated in FIG. 1. For example, video conferencing may be another form of communication.

Figure 4:
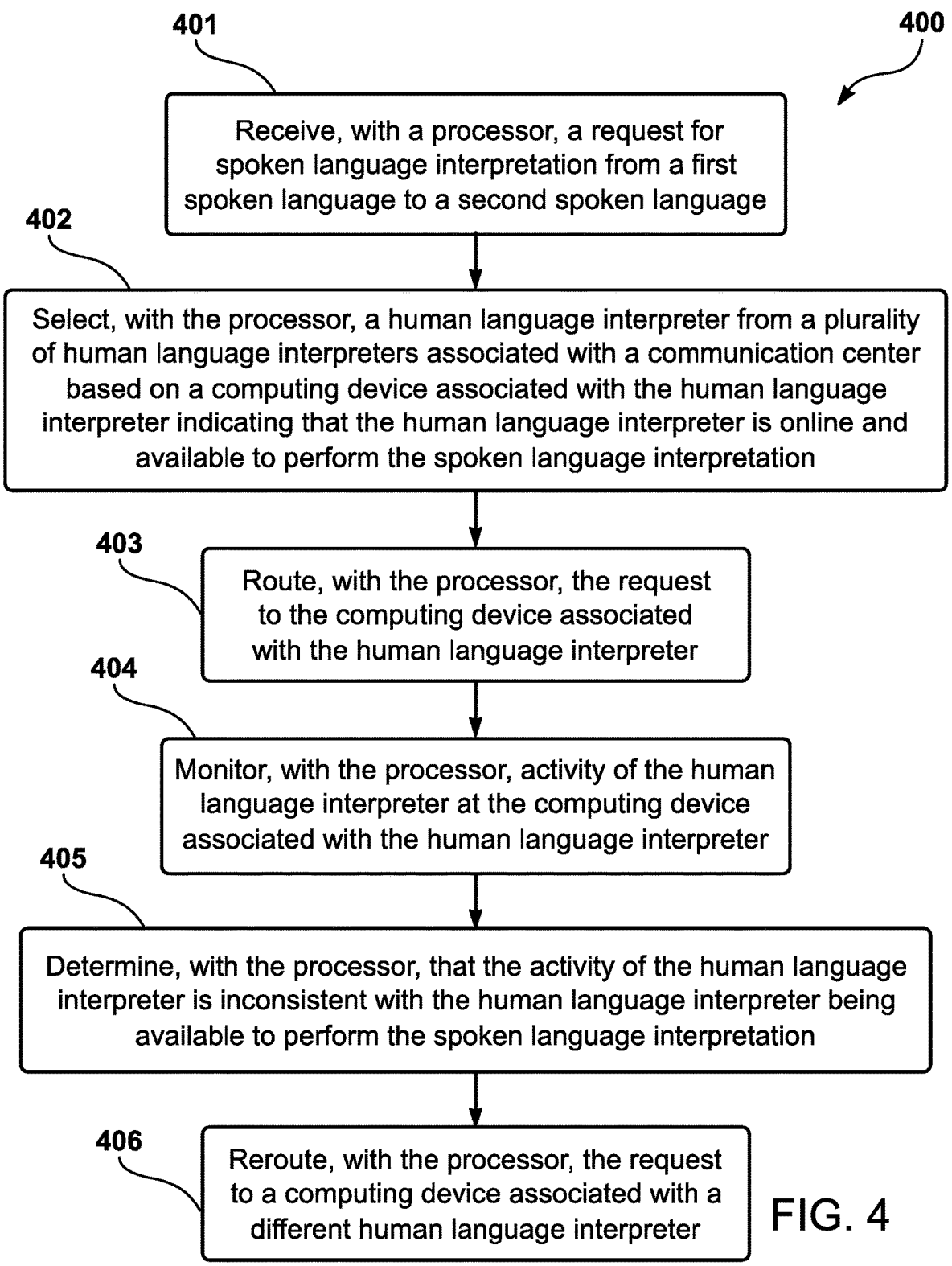
FIG. 4 illustrates a process that may be utilized by the monitoring and management configuration to monitor and manage agent activity/inactivity.

FIG. 4 illustrates a process 400 that may be utilized by the monitoring and management configuration 100 to monitor and manage agent activity/inactivity. At a process block 401, the process 400 receives a request for spoken language interpretation from a first spoken language to a second spoken language. Further, at a process block 402, the process 400 selects a language interpreter from a plurality of language interpreters associated with a communication center based on a computing device associated with the language interpreter indicating that the language interpreter is online and available to perform the spoken language interpretation. In addition, at a process block 403, the process 400 routes the request to the computing device associated with the human language interpreter. Moreover, at a process block 404, the process 400 monitors activity of the language interpreter at the computing device associated with the human language interpreter. At a process block 405, the process 400 also determines that the activity of the language interpreter is inconsistent with the language interpreter being available to perform the spoken language interpretation. In addition, at a process block 406, the process 400 reroutes the request to a different computing device associated with a different human language interpreter.

Figure 5:
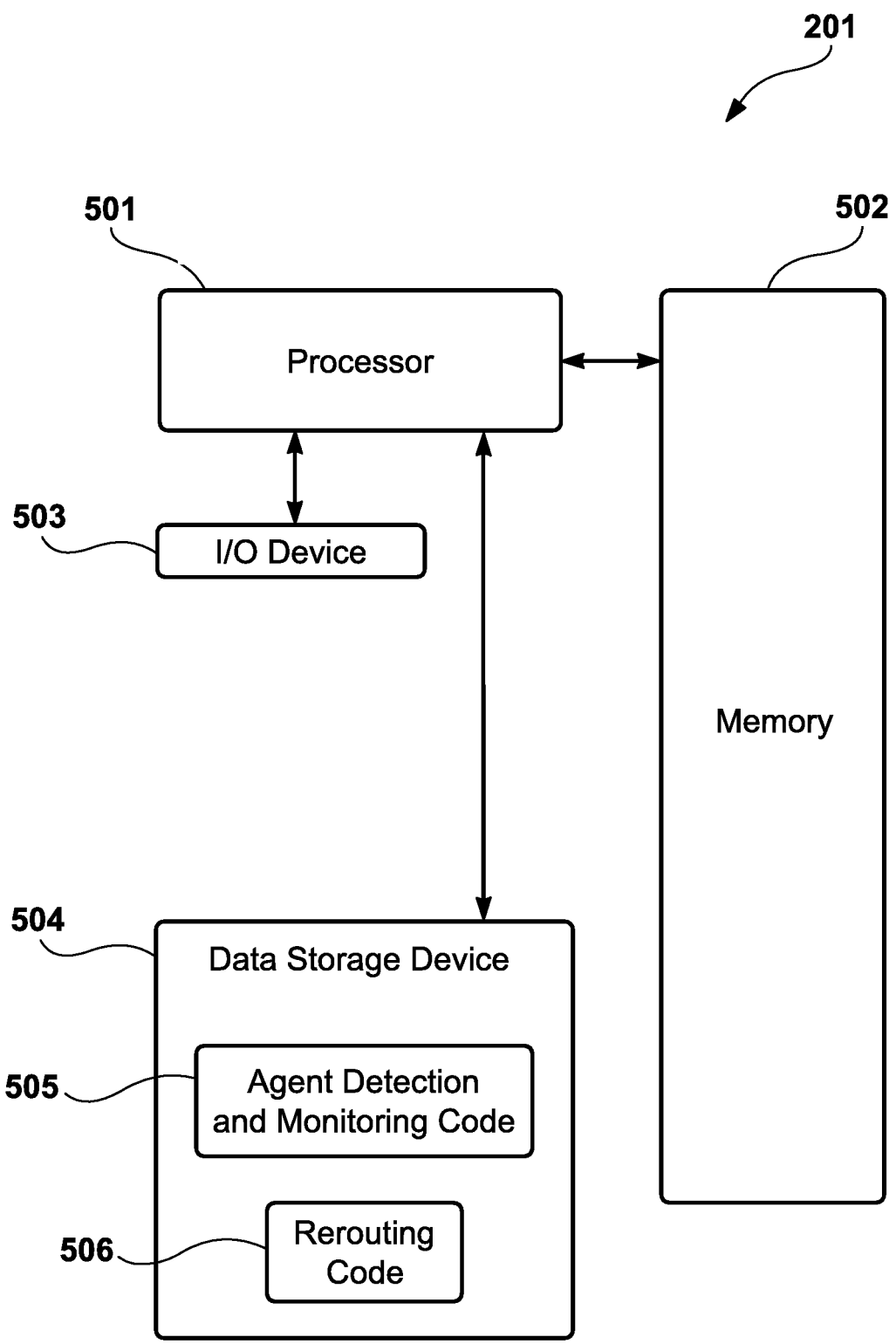
FIG. 5 illustrates the internal components of the language interpretation/translation platform illustrated in FIG. 1.

FIG. 5 illustrates the internal components of the language interpretation/translation platform 101 illustrated in FIG. 1. The language interpretation/translation platform 101 may include a processor 101, a memory 102, an input/output ("I/O") device 103 (e.g., microphone, audio recorder, image capture device, keyboard, touch-screen, joystick, gesture detection device, etc.), and data storage device 504.

The data storage device 504 may include agent detection and monitoring code 505 and rerouting code 506. The processor 501 may execute the agent detection and monitoring code 505 to detect and monitor agent activity. Further, the processor 501 may execute the rerouting code 506 to reroute a communication with the user 103 based on a determination of a lack of compliance with a predefined organizational policy.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A computer program product comprising a computer readable storage device having a computer readable program stored thereon, wherein the computer readable program when executed on a computer causes the computer to:

receive, with a processor, a request for spoken language interpretation from a first spoken language to a second spoken language;

select, with the processor, a human language interpreter from a plurality of human language interpreters associated with a communication center based on a computing device associated with the human language interpreter indicating that the human language interpreter is online and available to perform the spoken language interpretation;

route, with the processor, the request to the computing device associated with the human language interpreter;

monitor, with the processor, interactivity of the human language interpreter with a software application executed at the computing device associated with the human language interpreter;

determine, with the processor, that the interactivity matches a pattern of interactivity indicative of a substantial probability of the human language interpreter being unavailable to perform the spoken language interpretation, the pattern of interactivity being stored in a pattern database that stores a plurality of patterns corresponding to human language interpreter interactions with the software application, including agent activity of one or more different human language interpreters than the human language interpreter interacting with the software application prior to the interactivity of the human language interpreter with the software application, or prior agent activity of the human language interpreter interacting with the software application in one or more previous language interpretation sessions; and reroute, with the processor, the request to a different computing device associated with a different human language interpreter based upon the interactivity matching the pattern of interactivity.

2. The computer program product of claim 1, wherein the computer is further caused to monitor the interactivity of the human language interpreter by detecting voice energy emanating from the human language interpreter.

3. The computer program product of claim 2, wherein the voice energy is detected via a microphone apparatus in operable communication with the computing device.

4. The computer program product of claim 1, wherein the computer is further caused to monitor the interactivity by detecting a lack of one or more inputs performed by the human language interpreter at the computing device.

5. The computer program product of claim 1, wherein the computer is further caused to monitor the interactivity by detecting one or more surrounding environmental factors.

6. The computer program product of claim 1, wherein the computer is further caused to send a training video to the computing device so that the computing device displays data to the human language interpreter to train the human language interpreter to be consistent with the human language interpreter being available to perform the spoken language interpretation.

7. A method comprising:

receiving, with a processor, a request for spoken language interpretation from a first spoken language to a second spoken language;

selecting, with the processor, a human language interpreter from a plurality of human language interpreters associated with a communication center based on a computing device associated with the human language interpreter indicating that the human language interpreter is online and available to perform the spoken language interpretation;

routing, with the processor, the request to the computing device associated with the human language interpreter;

monitoring, with the processor, interactivity of the human language interpreter with a software application executed at the computing device associated with the human language interpreter;

determining, with the processor, that the interactivity of the language interpreter matches a pattern of interactivity indicative of a substantial probability of the human language interpreter being unavailable to perform the spoken language interpretation, the pattern of interactivity being stored in a pattern database that stores a plurality of patterns corresponding to human language interpreter interactions with the software application, including agent activity of one or more different human language interpreters than the human language interpreter interacting with the software application prior to the interactivity of the human language interpreter with the software application, or prior agent activity of the human language interpreter interacting with the software application in one or more previous language interpretation sessions; and rerouting, with the processor, the request to a different computing device associated with a different human language interpreter based upon the interactivity matching the pattern of interactivity.

8. The method of claim 7, further comprising monitoring the interactivity of the human language interpreter by detecting voice energy emanating from the human language interpreter.

9. The method of claim 8, wherein the voice energy is detected via a microphone apparatus in operable communication with the computing device.

10. The method of claim 7, further comprising monitoring the interactivity by detecting a lack of one or more inputs performed by the human language interpreter at the computing device.

11. The method of claim 7, further comprising monitoring the interactivity by detecting one or more surrounding environmental factors.

12. The method of claim 7, further comprising sending a training video to the computing device so that the computing device displays data to the human language interpreter to train the human language interpreter to be consistent with the human language interpreter being available to perform the spoken language interpretation.

13. An apparatus comprising:

a processor that receives a request for spoken language interpretation from a first spoken language to a second spoken language, selects a human language interpreter from a plurality of human language interpreters associated with a communication center based on a computing device associated with the human language interpreter indicating that the human language interpreter is online and available to perform the spoken language interpretation, routes the request to the computing device associated with the human language interpreter, monitors interactivity of the language interpreter with a software application executed at the computing device associated with the human language interpreter, determines that the interactivity matches a pattern of interactivity indicative of a substantial probability of the language interpreter being unavailable to perform the spoken language interpretation, including agent activity of one or more different human language interpreters than the human language interpreter interacting with the software application prior to the interactivity of the human language interpreter with the software application, or prior agent activity of the human language interpreter interacting with the software application in one or more previous language interpretation sessions, and reroutes the request to a different computing device associated with a different human language interpreter, the pattern of interactivity being stored in a pattern database that stores a plurality of patterns corresponding to human language interpreter interactions with the software application.

14. The apparatus of claim 13, wherein the processor further monitors the interactivity of the human language interpreter by detecting voice energy emanating from the human language interpreter.

15. The apparatus claim 14, further comprising a microphone apparatus that detects the voice energy.

16. A computer program product comprising a computer readable storage device having a computer readable program stored thereon, wherein the computer readable program when executed on a computer causes the computer to:
   receive, with a processor, a request to perform a service;
   select, with the processor, a human representative from a plurality of human representatives associated with a communication center based on a computing device associated with the human representative indicating that the human representative is online and available to perform the service;
   route, with the processor, the request to the computing device associated with the human representative;
   monitor, with the processor, interactivity of the human representative with a software application executed at the computing device associated with the human representative;
   determine, with the processor, that the interactivity matches a pattern of interactivity indicative of a substantial probability of the language interpreter being unavailable to perform the service, the pattern of interactivity being stored in a pattern database that stores a plurality of patterns corresponding to human representative interactions with the software application, including agent activity of one or more different human language interpreters than the human language interpreter interactinq with the software application prior to the interactivity of the human language interpreter with the software application, or prior agent activity of the human language interpreter interacting with the software application in one or more previous language interpretation sessions; and
   reroute, with the processor, the request to a different computing device associated with a different human representative based upon the interactivity matching the pattern of interactivity.

17. The computer program product of claim 1, wherein the pattern of interactivity is measured according to physical presence of a monitored human language interpreter and a monitored computing device operated by the human language interpreter being outside of a geographical threshold.

* * * * *